United States Patent
Hosokawa et al.

(10) Patent No.: US 9,073,505 B2
(45) Date of Patent: Jul. 7, 2015

(54) OCCUPANT DETERMINATION APPARATUS USING LOAD SENSOR

(71) Applicants: DENSO CORPORATION, Kariya, Aichi-pref. (JP); Honda Motor Co., Ltd., Tokyo (JP)

(72) Inventors: Toshio Hosokawa, Anjo (JP); Yusuke Muramatsu, Wako (JP); Mikihito Kojima, Wako (JP)

(73) Assignees: DENSO CORPORATION, Kariya (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/221,484

(22) Filed: Mar. 21, 2014

(65) Prior Publication Data

US 2014/0297132 A1    Oct. 2, 2014

(30) Foreign Application Priority Data

Mar. 29, 2013    (JP) ................................. 2013-071476

(51) Int. Cl.
*B60R 21/015*    (2006.01)

(52) U.S. Cl.
CPC .................................. *B60R 21/0152* (2014.10)

(58) Field of Classification Search
CPC .................. B60R 21/015; B60R 2021/01575; B60R 2021/01516; B60R 2021/01541; G01G 19/4142; G06K 9/2027; G06K 9/00362; B60N 2/002
USPC .......... 701/36, 45, 49; 280/734, 735; 180/667
See application file for complete search history.

(56) References Cited

U.S. PATENT DOCUMENTS

| | | | |
|---|---|---|---|
| 6,345,839 B1 * | 2/2002 | Kuboki et al. | |
| 6,494,284 B1 * | 12/2002 | Cooper | |
| 7,165,785 B2 * | 1/2007 | Bouladian | |
| 7,295,910 B2 * | 11/2007 | Sakai et al. | |
| 8,665,103 B2 * | 3/2014 | Hayakawa et al. | |
| 2003/0154805 A1 | 8/2003 | Takafuji et al. | |
| 2005/0090958 A1 * | 4/2005 | Hattori et al. | |
| 2005/0131605 A1 * | 6/2005 | Nakamoto et al. | |

(Continued)

FOREIGN PATENT DOCUMENTS

JP    09-207638    8/1997
JP    2003-240628    8/2003

OTHER PUBLICATIONS

U.S. Appl. No. 14/221,505, filed Mar. 21, 2014, by Toshio Hosokawa.

*Primary Examiner* — Mary Cheung
*Assistant Examiner* — Rodney Butler
(74) *Attorney, Agent, or Firm* — Harness, Dickey & Pierce, PLC

(57) ABSTRACT

A load sensor detects a load of an occupant on a seat of a vehicle and provides a load signal. A determination section determines a physical size of the occupant by classifying the load signal into a subject class among a plurality of classes ordered from small to large based on threshold loads and performs an inter-class transition of the subject class from a transition source class into a transition destination class based on change of the received load signal. When (i) both the transition source class and the transition destination class belong to an airbag-inflating class that enables inflating of an airbag, and, simultaneously, (ii) the transition destination class is smaller than the transition source class and immediately adjacent to the transition source class, the determination section makes the determined class remain in the transition source class.

3 Claims, 8 Drawing Sheets

(56) References Cited

U.S. PATENT DOCUMENTS

2005/0216158 A1* 9/2005 Sakai
2007/0012502 A1* 1/2007 Molitor et al.
2007/0176402 A1* 8/2007 Irie et al.
2007/0200721 A1* 8/2007 Stanley et al.
2009/0302580 A1* 12/2009 Kang et al.
2010/0207773 A1* 8/2010 Hayakawa et al.

* cited by examiner

| CLASS C | IN-VEHICLE CONTROL | |
|---|---|---|
| | INFLATE AIRBAG | INDICATOR |
| LARGE ADULT | STRONG | "ON" LAMP |
| SMALL ADULT | MIDDLE | |
| CHILD | WEAK | |
| CRS + INFANT | NONE | "OFF" LAMP |
| VACANT | | NO LIGHTING |

OCCUPANT DETERMINATION APPARATUS USING LOAD SENSOR

CROSS REFERENCE TO RELATED APPLICATION

The present application is based on Japanese Patent Application No. 2013-71476 filed on Mar. 29, 2013, the disclosure of which is incorporated herein by reference.

TECHNICAL FIELD

The present disclosure relates to an occupant determination apparatus in a vehicle for determining an occupant in the vehicle using a load sensor provided in an in-vehicle seat to suitably control a safety apparatus against collision such as an airbag.

BACKGROUND ART

[Patent Literature 1] JP-2003-240628 A (US 2003/0154805 A1)
[Patent Literature 2] JP-H09-207638 A In order to control inflation of an airbag, it is desirable to (i) recognize beforehand the physical size of an occupant, who is to be protected and (ii) control an inflation mode of the airbag. To that end, a load sensor has been built into a vehicle or a seat in the vehicle to provide an output voltage according to a load due to an occupant. The output voltage is then classified into one of classes (i.e., states) including a vacant seat class, a child class, an adult class, etc. based on predetermined threshold loads.

The output of a load sensor changes according to the change in occupant's posture or an acceleration G due to travel motion of the vehicle. The resultant change in the output of the load sensor further provides the temporary output of incorrect determination when threshold values are fixed.

Patent Literature 1 discloses a technology to overcome such an issue, for example. The technology includes a load sensor to detect a load, which is applied to a seat in a vehicle; and a determination section to determine (i) presence or absence of an occupant and (ii) the physical size of the occupant, if present, by classifying the detected load into one of several classes using predetermined class threshold loads. When a detected load continuously remains in a subject class among a plurality of classes longer than a predetermined threshold time (duration), it is determined that an inter-class transition into the subject class has arisen. Further, mutually different predetermined threshold times are prepared for at least some of the inter-class transitions.

Incidentally, in order to improve occupant protection, the number of classes of occupant physical sizes tends to increase to realize an airbag control that can respond to an individual occupant physical size. To that end, an occupant determination apparatus is also required to prepare multiple classes of occupants or their physical sizes.

In addition, four load sensors may be disposed in a leg portion of a vehicle seat for detecting all the loads applied to the seat. In contrast, Patent Literature 2 proposes a technology to reduce the number of load sensors from four to two.

SUMMARY

The present Inventor considered the following. As explained above, the reduction of the number of load sensors may cause the inclination of the load to a none-sensor portion where no load sensor is provided. In such a case, the load inclining to the none-sensor portion cannot be detected; this reduces the sum of the load detected by the load sensors in comparison with the case where there is no inclination. As a result, the change in the detected load increases as compared with the case of detecting all the load applied to the seating portion. Furthermore, the increase of the number of classes of occupants makes a load range of each class narrower. The change of the load based on the change of occupant's posture or based on acceleration due to travel motion of the vehicle increases the possibility of mistakenly determining the inter-class transition.

Even in Patent Literature 1, the change of the system specifications such as the increase of classes of occupants or the decrease of the number of load sensors may involve an incorrectly determined inter-class transition; this may lead to an unsuitable airbag control.

It is an object of the present disclosure to provide an occupant determination apparatus that appropriately performs inter-class transitions between classes of occupants or physical sizes of occupants to reduce erroneous determination, thereby enabling a suitable airbag control.

To achieve the above object, according to an example of the present disclosure, an occupant determination apparatus in a vehicle is provided to control an airbag to protect an occupant and include a load sensor and a determination section. The load sensor is to detect a load of the occupant who is seated in a seat of the vehicle and provide the detected load as a load signal. The determination section is to determine (i) presence or absence of the occupant and (ii) a physical size of the occupant by classifying the load signal into a subject class among a plurality of classes, which are ordered from small to large according to the physical size, based on predetermined threshold loads, the subject class being stored as a determined class, and perform an inter-class transition of the determined class from a transition source class being a present class into a transition destination class being a next class based on change of the received load signal. Further, the determination section makes the determined class remain in the transition source class when (i) both the transition source class and the transition destination class belong to an airbag-inflating class that enables inflating of the airbag, and, simultaneously, (ii) the transition destination class is smaller than the transition source class and immediately adjacent to the transition source class.

The above configuration can provide an advantageous effect to reduce an erroneous determination of determining a reduced detected load as a smaller load class because of the change of the load based on the change of occupant's posture or based on acceleration due to travel motion of the vehicle, thereby achieving a suitable airbag control.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

An embodiment according to the present disclosure will be explained with reference to drawings.

Figure 1:
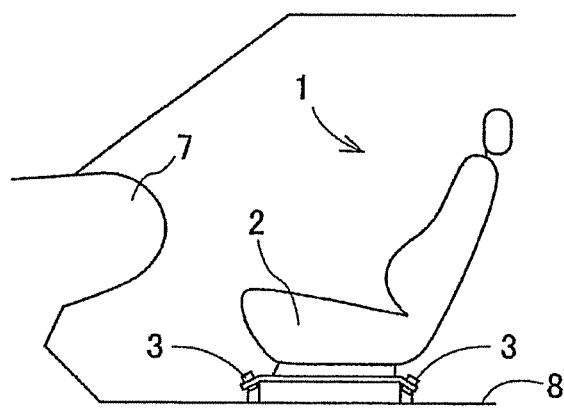
FIG. 1 is a schematic side-view diagram illustrating a seat, an airbag, and load sensors of an occupant determination apparatus according to an embodiment of the present disclosure.
Figure 2:
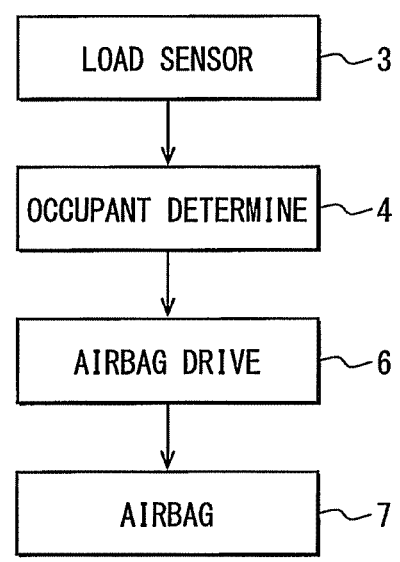
FIG. 2 is a block diagram schematically illustrating a configuration of the occupant determination apparatus.

With reference to FIGS. 1 and 2, an occupant determination apparatus according to an embodiment of the present disclosure includes a seat 1 of a vehicle; a plurality of load sensors 3; and an occupant determination unit 4. The plurality of load sensors 3 may be correctively referred to as a load sensor device 3. The load sensors 3 are disposed in a leg portion between a bottom of a seating portion 2 of the seat 1 and a vehicle-body floor 8; the load sensors 3 are to detect the weight of an occupant who is seated on the seating portion 2. The occupant determination unit 4 includes a microcomputer that performs arithmetic processing of load signals from the load sensors 3; the microcomputer comes with an A/D converter. The occupant determination unit 4 may be also referred to as a determination section.

Each load sensor 3 includes (i) a rubber layer and (ii) a pair of electrodes. The rubber layer is mixed with conductive particles to reduce an electric resistance value depending on compressive force. The pair of electrodes are provided to be stuck firmly to the respective opposite sides of the rubber layer such that the rubber layer is sandwiched in between two electrodes. When a human body (or physical solid) is seated on the seat 1, the electrical resistance in between the electrodes falls with the increase of the weight of the human body. In between the electrodes, a predetermined direct current voltage or a constant electric current is applied via a load resistance; this exhibits a voltage drop. The occupant determination unit 4 converts the resultant voltage drop into a digital signal using the A/D converter and reads the signal to thereby detect the weight of the occupant seated on the seat 1. It is noted that each load sensor 3 may be shaped of a sheet and inbedded in an upper portion of the seating portion 2.

The load sensor 3 may be differently provided to be a load cell such as a strain gauge type, a semiconductor type, a magnetostriction type, and an electrostatic capacity type. Those types may be used suitably depending on each characteristic or cost. Here, any one of those types provides an analog output; this requires an A/D converter. In addition, in the present embodiment, the load sensor device is provided as being configured by four separate load sensors 3; however, the number of load sensors 3 constituting the load sensor device 3 may be changed to another number as needed.

The occupant determination unit 4 sums up the load signals of the plurality of the load sensors 3 to obtain a detected load W of the load sensor device 3. The detected load W is a digital signal into which the analog signals of the load sensors 3 are converted by the A/D converter of the occupant determination unit 4. It is noted that the detected load W may be a present value (i.e., instantaneous value) detected presently by the load sensors 3 or an average value, which is based on the detected values during the just previous short period of time while undergoing the removal of the high frequency noise components.

Figures 3, 4:
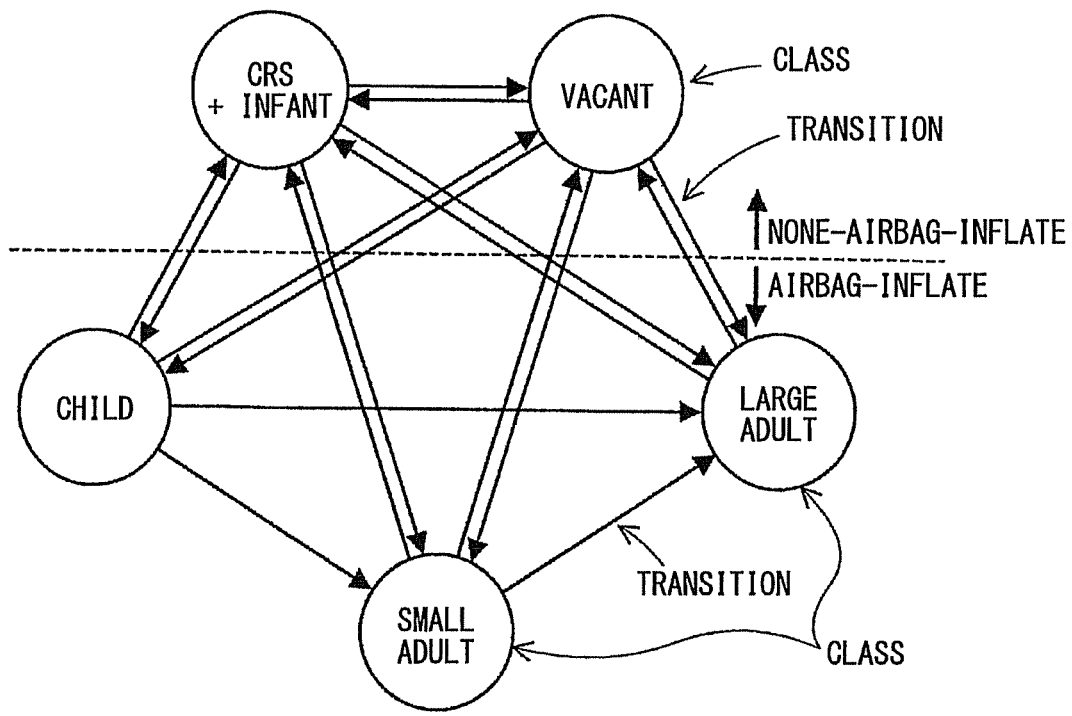
FIG. 3 is a diagram for explaining inter-class transitions.
FIG. 4 is a diagram illustrating classes of occupant physical sizes and relevant in-vehicle control.
Figure 5:
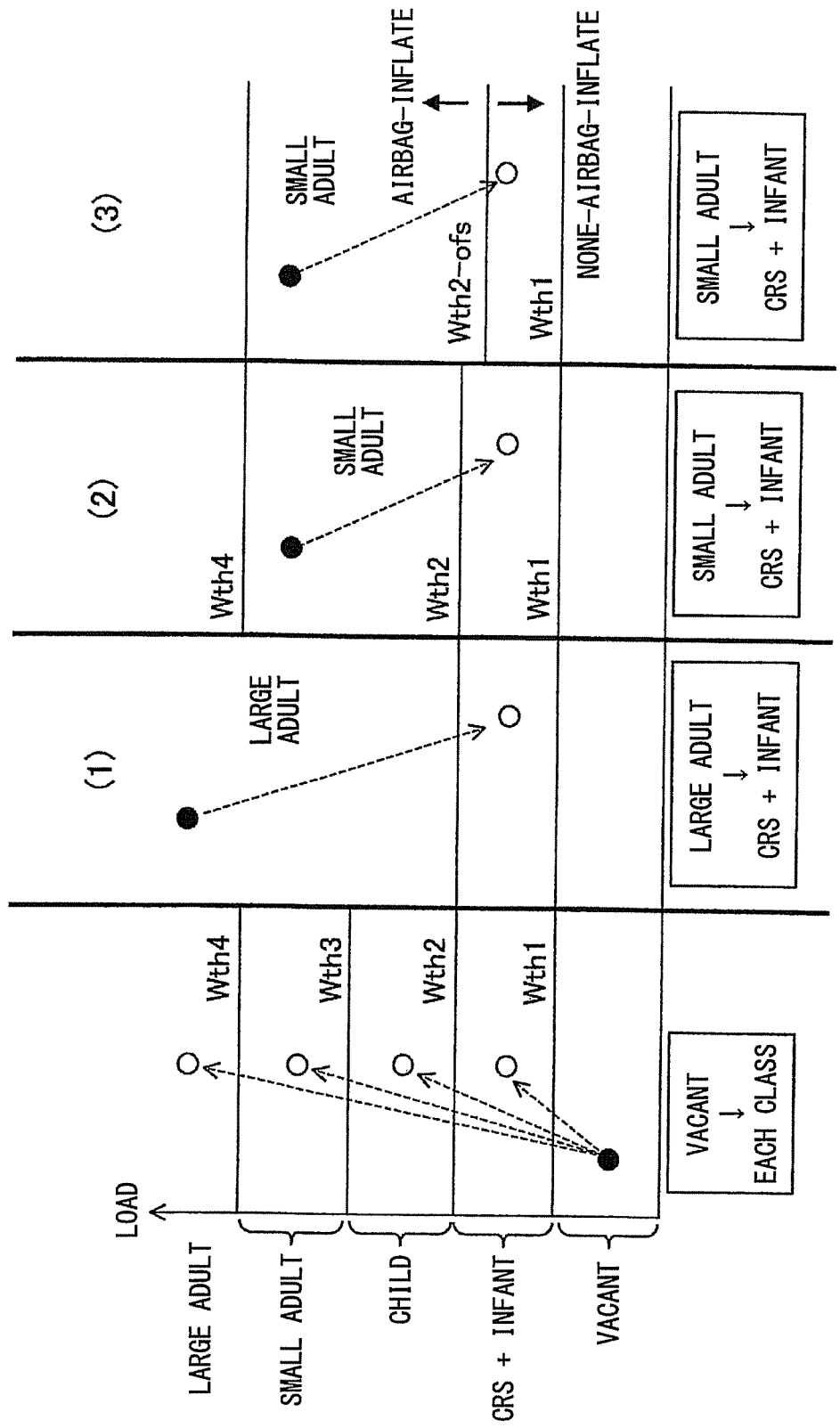
FIG. 5 is a diagram illustrating a relation between classes and threshold loads.

With reference to FIGS. 4 and 5, threshold loads Wth1 to Wth4 are provided as becoming greater or ascending from small to large in value or load in the following order from Wth1, through Wth2 and Wth3, to Wth4. Based on threshold loads Wth1 to Wth4, the detected load W is classified into one (i.e., subject class) of five occupant classes, which are (i) a "vacant seat" class, (ii) a "CRS(Child Restraint System)+infant" class, (iii) a "child" class, (iv) a "small adult (adult having a small physical size)" class, and (v) a "large adult (adult having a large physical size)" class. The classifying-resultant subject class is stored as a determined class C in a storage portion of the occupant determination unit 4.

The determined class C is transmitted as one of state signals to the airbag drive unit 6. According to the received signal, the airbag drive unit 6 controls the airbag 7 to selectively perform one of four inflation states of (i) a none inflation state corresponding to both the "vacant seat" class and the "CRS(Child Restraint System)+infant" class, (ii) a weak inflation state corresponding to the "child" class, (iii) an intermediate (middle) inflation state corresponding to the "small adult" class, and (iv) a strong inflation state corresponding to the "large adult" class. The inflation state signifies a condition of an airbag 7 of whether or not to inflate when an occurrence of a collision of the vehicle is determined. Further, the "vacant seat" class and the "CRS+infant" class each may be referred to as a none-airbag-inflating class, which disables inflating the airbag 7 at a collision of the vehicle or is not a target class of inflating the airbag 7. In contrast, the "child" class, the "small adult", and the "large adult" class each are an airbag-inflating class, which enables inflating of the airbag 7 at a collision of the vehicle, or is a target class of inflating the airbag 7.

Furthermore, the airbag drive unit 6 controls a lamp state or a lighting state of an indicator depending on the inflation state performed in the airbag 7. It is noted that the number of the occupant classes may be changed as needed depending on vehicle types or vehicle grades. In addition, the airbag drive unit 6 may be provided as an integrated unit by further incorporating the function of the occupant determination unit 4.

Processes of determination/inter-class transition executed by the occupant determination unit 4 serving as the determination section (i.e., microcomputer of the occupant determination unit 4) will be explained with reference to flowcharts in FIGS. 6 to 11. It is noted that an inter-class transition may be defined as a transition of the class C or determined class from a transition source class into a transition destination class. The present process enables inter-class transitions illustrated in FIG. 3.

It is further noted that a flowchart in the present application includes sections (also referred to as steps), which are represented, for instance, as S1. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

Figure 6:
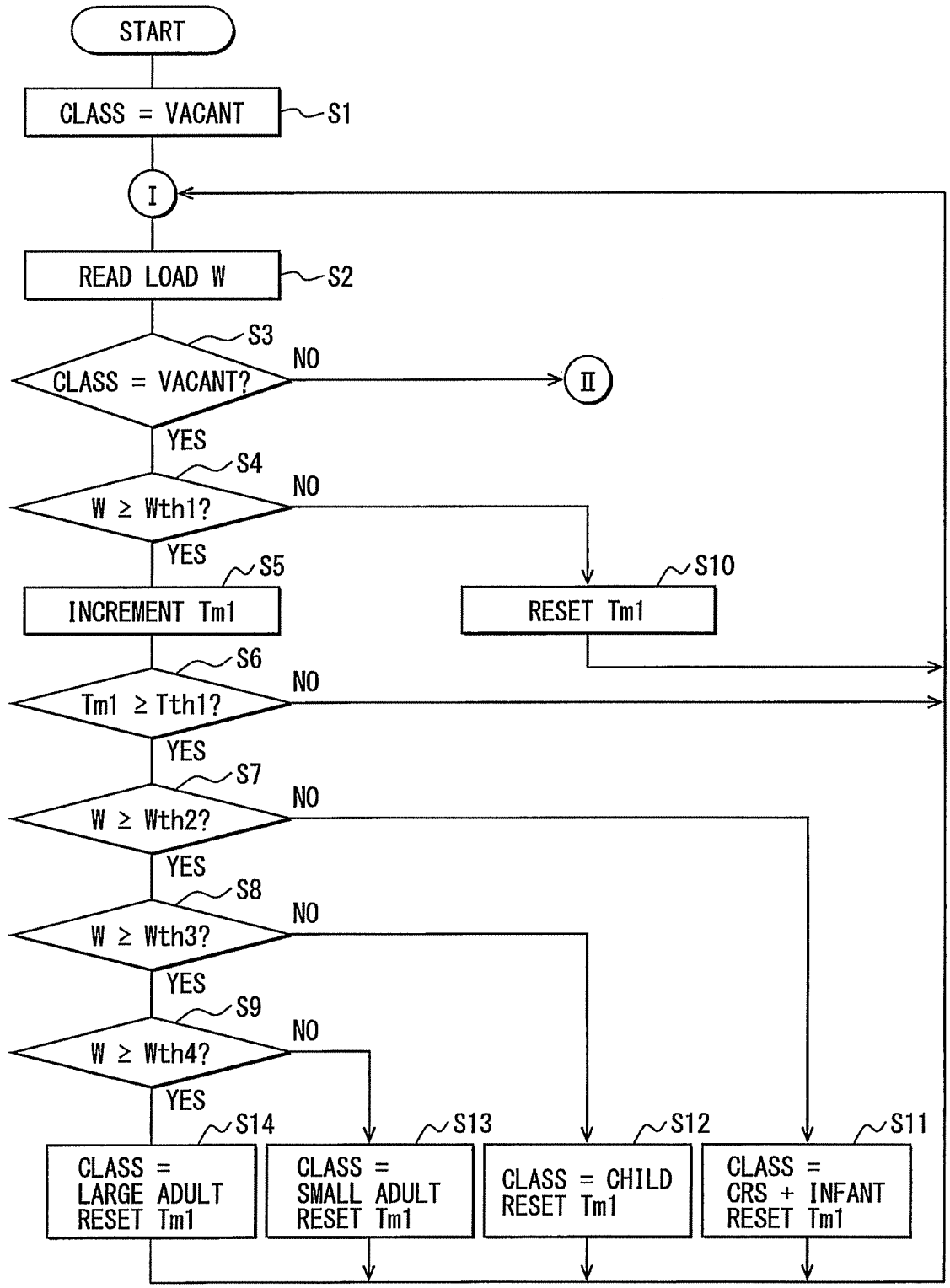
FIG. 6 is a flowchart diagram illustrating a class determination process performed when and after an occupant gets in a vehicle.

First, FIG. 6 is a flowchart diagram illustrating a class determination process when and after an occupant gets in a vehicle. At S1, timers Tm1 to Tm8 are reset while the determined class C is designated as the "vacant seat" class. At S2, the load signals of the load sensors 3 are read and converted to obtain a detected load W. At S3, it is determined whether the determined class C is the "vacant seat" class at present. When it is the "vacant seat" class, at S4 it is determined whether the load W is equal to larger than the threshold load Wth1. When the load W is equal to or larger than the threshold load Wth1, at S5 the timer Tm1 starts to increment a count. At S6, it is determined whether the count of the timer Tm1 reaches a threshold time Tth1. When it is determined at S4 that the load W is smaller than the threshold load Wth1, at S10 the timer Tm1 is reset; then, the processing returns to "I" to repeat the flow from S2.

When it is determined at S6 that the count of the timer Tm1 reaches the threshold time Tth1, at S7 it is determined whether the load W is equal to larger than the threshold load Wth2. In addition, when it is determined at S6 that the count of the timer Tm1 does not reach the threshold time Tth1, the processing returns to "I" to repeat the flow from S2.

When it is determined at S7 that the load W is equal to or larger than the threshold load Wth2, at S8 it is determined whether the load W is equal to larger than the threshold load Wth3. In addition, when it is determined at S7 that the load W is smaller than the threshold load Wth2, at S11 it is determined that the class C is anew the "CRS+infant" class and the timer Tm1 is reset.

When it is determined at S8 that the load W is equal to or larger than the threshold load Wth3, at S9 it is determined whether the load W is equal to larger than the threshold load Wth4. In addition, when the load W is smaller than the threshold load Wth3, at S12 it is determined that the class C is anew the "child" class and the timer Tm1 is reset.

When it is determined at S9 that the load W is smaller than the threshold load Wth4, at S13 it is determined the class C is anew the "small adult" class and the timer Tm1 is reset. In addition, when the load W is equal to or larger than the threshold load Wth4, at S14 it is determined that the class C is anew the "large adult" class and the timer Tm1 is reset.

Thus, when an occupant gets in the vehicle and is seated on the seating portion 2, the detected load W is compared with the threshold loads Wth1, Wth2, Wth3, and Wth4. This achieves an initial determination of the class C to determine the class C to be one of four classes of (i) the "CRS+infant" class, (ii) the "child" class, (iii) the "small adult" class, and (iv) the "large adult" class, which are illustrated in FIGS. 4 and 5.

Figure 7:
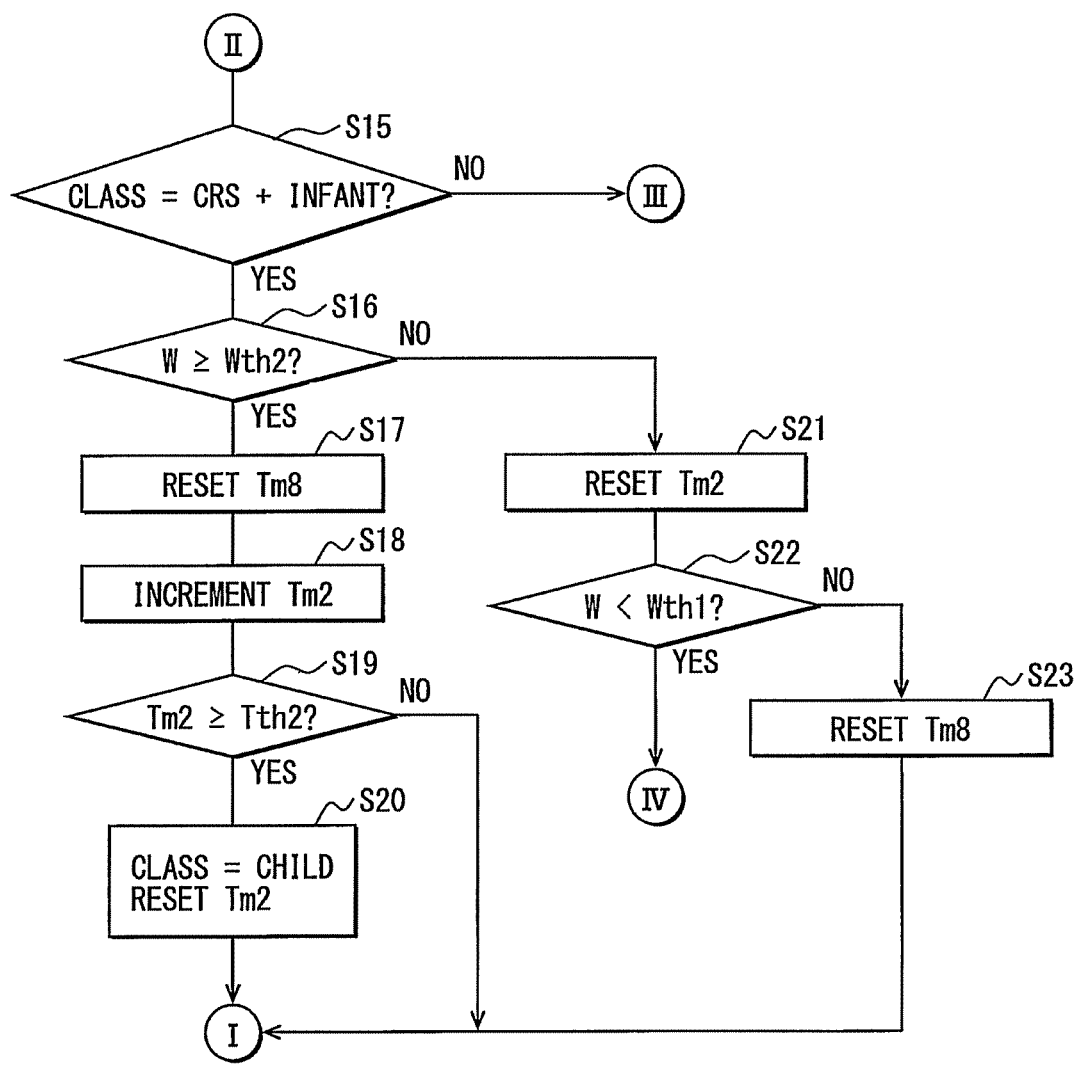
FIG. 7 is a flowchart diagram illustrating a process which performs an inter-class transition from a "CRS (child restraint system)+infant" class into a "child" class.

When it is determined at S3 that the present class C is not the "vacant seat" class, namely, when the present class C is one of the "CRS+infant" class, the "child" class, the "small adult" class, and the "large adult" class, the processing proceeds to "II" in FIG. 7. FIG. 7 is a flowchart diagram illustrating a process which performs an inter-class transition from the "CRS (Child Restraint System)+infant" class into the "child" class. At S15, it is determined whether the present determined class C is the "CRS+infant" class. When it is determined at S15 that the class C is the "CRS+infant" class, at S16 it is determined whether the load W is equal to larger than the threshold load Wth2. When the load W is equal to or larger than the threshold load Wth2, at S17 the timer Tm8 is reset, and at S18 the timer Tm2 starts to increment a count. At S19, it is determined whether the count of the timer Tm2 reaches a threshold time Tth2. When it is determined at S19 that the count of the timer Tm2 reaches the threshold time Tth2, at S20 the determined class C transitions into the "child" class and the timer Tm2 is reset. The processing then returns to "I" in FIG. 6. When it is determined at S19 that the count of the timer Tm2 does not reach the threshold time Tth2, the processing similarly returns to "I" in FIG. 6.

When it is determined at S16 that the load W is smaller than the threshold load Wth2, at S21 the timer Tm2 is reset. At S22, it is determined whether the load W is smaller than the threshold load Wth1. When the load W is smaller than the threshold load Wth1, the processing proceeds to "VI" in FIG. 11. When the load W is equal to or larger than the threshold load Wth1, at S23 the timer Tm8 is reset. The processing then proceeds to "I" in FIG. 6.

Figure 8:
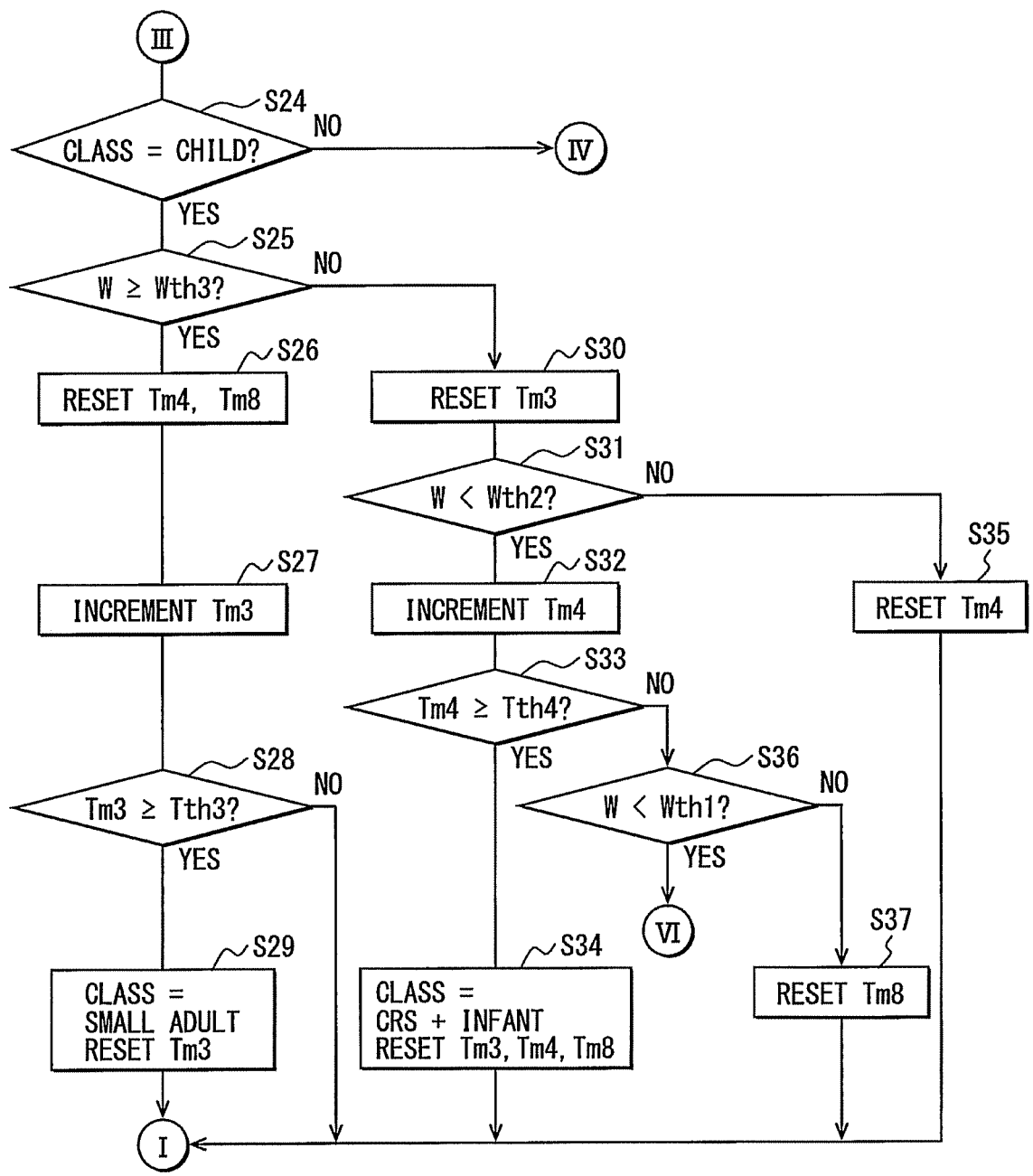
FIG. 8 is a flowchart diagram illustrating a process which performs an inter-class transition from a "child" class into a "small adult" class or a "CRS+infant" class.

When it is determined at S15 that the present class C is not the "CRS+infant" class, namely, when the class C is one of the "child" class, the "small adult" class, and the "large adult" class, the processing proceeds to "III" in FIG. 8. FIG. 8 is a flowchart diagram illustrating a process which performs an inter-class transition from the "child" class into the "small adult" class or the "CRS+infant" class. At S24 it is determined whether the present determined class C is the "child" class. When it is determined at S24 that the class C is the "child" class, at S25 it is determined whether the load W is equal to larger than the threshold load Wth3. When the load W is equal to or larger than the threshold load Wth3, at S26 the timer Tm4 and the timer Tm8 are reset. At S27, the timer Tm3 starts to increment a count. At S28, it is determined whether the count of the timer Tm3 reaches a threshold time Tth3. When it is determined at S28 that the count of the timer Tm3 reaches the threshold time Tth3, at S29 the determined class C transitions into the "small adult" class and the timer Tm3 is reset. The processing then returns to "I" in FIG. 6. When it is determined at S28 that the count of the timer Tm3 does not reach the threshold time Tth3, the processing similarly returns to "I" in FIG. 6.

When it is determined at S25 that the load W is smaller than the threshold load Wth3, at S30 the timer Tm3 is reset. At S31, it is determined whether the load W is smaller than the threshold load Wth2. When the load W is smaller than the threshold load Wth2, at S32 the timer Tm4 starts to increment a count. At S33, it is determined whether the count of the timer Tm4 reaches a threshold time Tth4. When it is determined at S33 that the count of the timer Tm4 reaches the threshold time Tth4, at S34 the determined class C transitions into the "CRS+infant" class and the timers Tm3, Tm4, and Tm8 are reset. The processing then proceeds to "I" in FIG. 6.

When it is determined at S31 that the load W is equal to or larger than the threshold load Wth2, at S35 the timer Tm4 is reset. The processing then proceeds to "I" in FIG. 6. When it is determined at S33 that the count of the timer Tm4 does not reach the threshold time Tth4, at S36 it is determined whether the load W is smaller than the threshold load Wth1. When the load W is smaller than the threshold load Wth1, the processing proceeds to "VI" in FIG. 11. When the load W is equal to or larger than the threshold load Wth1, at S37 the timer Tm8 is reset. The processing then proceeds to "I" in FIG. 6.

Figure 9:
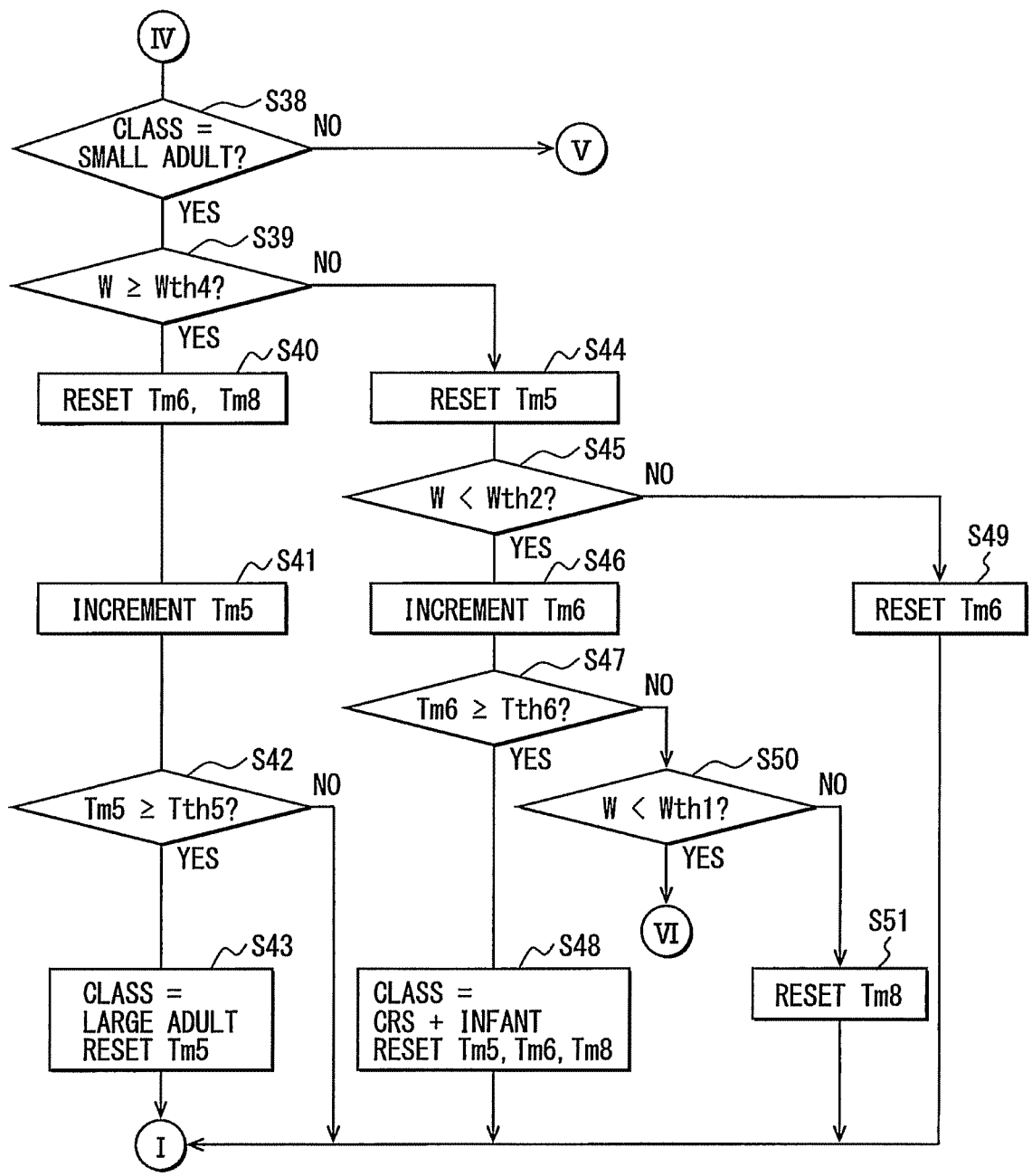
FIG. 9 is a flowchart diagram illustrating a process which performs an inter-class transition from a "small adult" class into a "large adult" class or a "CRS+infant" class.

When it is determined at S24 that the present class C is not the "child" class, but the "small adult" class or the "large adult" class, the processing proceeds to "IV" in FIG. 9. FIG. 9 is a flowchart diagram illustrating a process which performs an inter-class transition from the "small adult" class into the "large adult" class or the "CRS+infant" class. At S38, it is determined whether the present class C is the "small adult" class. When it is the "small adult" class, at S39 it is determined whether the load W is equal to larger than the threshold load Wth4. When the load W is equal to or larger than the threshold load Wth4, at S40 the timer Tm6 and the timer Tm8 are reset. At S41 the timer Tm5 starts to increment a count. At S42, it is determined whether the count of the timer Tm5 reaches a threshold time Tth5. When the count of the timer Tm5 reaches the threshold time Tth5, at S43 the determined class C transitions into the "large adult" class and the timer Tm5 is reset. The processing then returns to "I" in FIG. 6. When it is determined at S42 that the count of the timer Tm5 does not reach the threshold time Tth5, the processing similarly returns to "I" in FIG. 6.

When it is determined at S39 that the load W is smaller than the threshold load Wth4, at S44 the timer Tm5 is reset. At S45, it is determined whether the load W is smaller than the threshold load Wth2. When the load W is smaller than the threshold load Wth2, at S46 the timer Tm6 starts to increment a count. At S47, it is determined whether the count of the timer Tm6 reaches a threshold time Tth6. When the count of the timer Tm6 reaches the threshold time Tth6, at S48 the determined class C transitions into the "CRS+infant" class and the timers Tm5, Tm6, and Tm8 are reset. Thus, as indicated in FIG. 3, the "small adult" class transitions into the "CRS+infant" class not into the "child" class. The processing then proceeds to "I" in FIG. 6.

When it is determined at S45 that the load W is equal to or larger than the threshold load Wth2, at S49 the timer Tm6 is reset. The processing then proceeds to "I" in FIG. 6. When it is determined at S47 that the count of the timer Tm6 does not reach the threshold time Tth6, at S50 it is determined whether the load W is smaller than the threshold load Wth1. When the load W is smaller than the threshold load Wth1, the processing proceeds to "VI" in FIG. 11. When the load W is equal to or larger than the threshold load Wth1, at S51 the timer Tm8 is reset. The processing then proceeds to "I" in FIG. 6.

Figure 10:
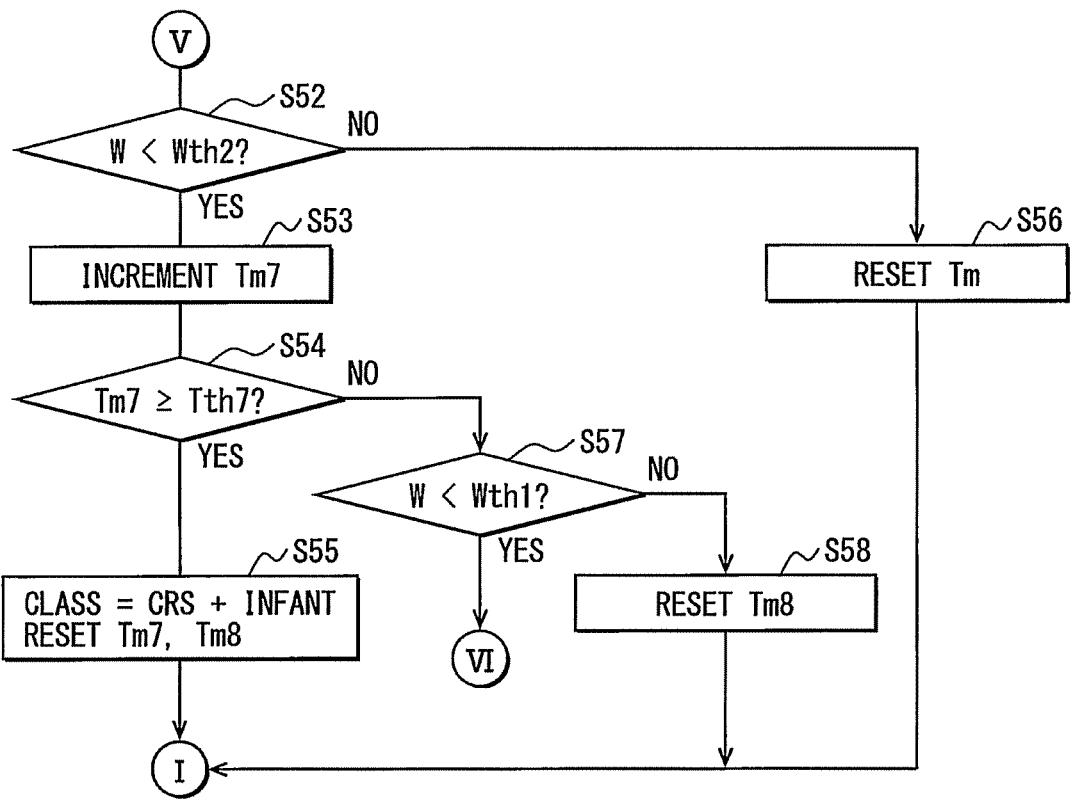
FIG. 10 is a flowchart diagram illustrating a process which performs an inter-class transition from a "large adult" class into a "CRS+infant" class.

When it is determined at 538 that the class C is not the "small adult" class, but the "large adult" class, the processing proceeds to "V" in FIG. 10. FIG. 10 is a flowchart diagram illustrating a process which performs an inter-class transition from the "large adult" class into the "CRS+infant" class. At S52, it is determined whether the load W is smaller than the threshold load Wth2. When the load W is smaller than the threshold load Wth2, at S53 the timer Tm7 starts to increment a count. At S54, it is determined whether the count of the timer Tm7 reaches a threshold time Tth7. When the count of the timer Tm7 reaches the threshold time Tth7, at S55 the determined class C transitions into the "CRS+infant" class and the timers Tm7 and Tm8 are reset. Thus, as indicated in FIG. 3, the "large adult" transitions into the "CRS+infant" class not into the "small adult" class. The processing then returns to "I" in FIG. 6.

When it is determined at S52 that the load W is equal to or larger than the threshold load Wth2, at S56 the timer Tm7 is reset. The processing then proceeds to "I" in FIG. 6. When it is determined at S54 that the count of the timer Tm7 does not reach the threshold time Tth7, at S57 it is determined whether the load W is smaller than the threshold load Wth1. When the load W is smaller than the threshold load Wth1, the processing proceeds to "VI" in FIG. 11. When the load W is equal to or larger than the threshold load Wth1, at S58 the timer Tm8 is reset. The processing then proceeds to "I" in FIG. 6.

Figure 11:
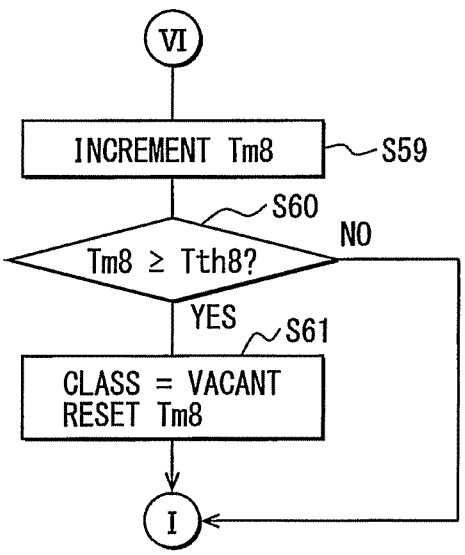
FIG. 11 is a flowchart diagram illustrating a class determination process performed when and after an occupant gets off a vehicle.

FIG. 11 is a flowchart diagram illustrating a class determination process when and after the occupant gets off the vehicle. With reference to "VI" in FIG. 11 that is called for from "VI" in FIGS. 7 to 10, at S59 the timer Tm8 starts to increment a count. At S60, it is determined whether the count of the timer Tm8 reaches a threshold time Tth8. When the count of the timer Tm8 reaches the threshold time Tth8, S61 is processed as follows. That is, (i) the determined class C transitions into the "vacant seat" class; (ii) it is determined that the present state is a state where the occupant leaves or gets off the vehicle; and (iii) the timer Tm8 is reset. The processing then proceeds to "I" in FIG. 6. When it is determined at S60 that the count of the timer Tm8 does not reach the threshold time Tth8, the processing similarly proceeds to "I" in FIG. 6.

In the above-mentioned explanation, the threshold time Tth1 corresponds to the timer Tm1 used for initial determination of the class C from the "vacant seat" class into one of four classes of the "CRS+infant" class, the "child" class, the "small adult," and the "large adult" class. Thus, in order to perform seated occupant classification or determination quickly when an occupant gets in the vehicle, the threshold time Tth1 is designated as a time such as three (3) seconds comparatively shorter than other threshold times for inter-class transitions.

The threshold time Tth2 corresponds to the timer Tm2 used for inter-class transition of the class C from the "CRS+infant" class into the "child" class. In order to require the reliability on inter-class transition or the stability of determination, the threshold time Tth2 is designated as a time such as 20 to 30 seconds comparatively longer than the threshold time Tth1 for the initial determination of the class C when an occupant gets in the vehicle.

The threshold time Tth3 corresponds to the timer Tm3 used for inter-class transition of the class C from the "child" class into the "small adult" class. In order to require the reliability on inter-class transition or the stability of determination, the threshold time Tth3 is designated as a time such as 20 to 30 seconds comparatively longer than the threshold time Tth1 for the initial determination of the class C when an occupant gets in the vehicle.

The threshold time Tth4 corresponds to the timer Tm4 used for inter-class transition of the class C from the "child" class into the "CRS+infant" class. In order to require the reliability on inter-class transition or the stability of determination, the threshold time Tth4 is designated as a time such as 20 to 30 seconds comparatively longer than the threshold time Tth1 for the initial determination of the class C when an occupant gets in the vehicle.

The threshold time Tth5 corresponds to the timer Tm5 used for inter-class transition of the class C from the "small adult" class into the "large adult" class. In order to require the reliability on inter-class transition or the stability of determination, the threshold time Tth5 is designated as a time such as 20 to 30 seconds comparatively longer than the threshold time Tth1 for the initial determination of the class C when an occupant gets in the vehicle.

The threshold time Tth6 corresponds to the timer Tm6 used for inter-class transition of the class C from the "small adult" class into the "CRS+infant" class. In order to require the reliability on inter-class transition or the stability of determination, the threshold time Tth6 is designated as a time such as 20 to 30 seconds comparatively longer than the threshold time Tth1 for the initial determination of the class C when an occupant gets in the vehicle.

The threshold time Tth7 corresponds to the timer Tm6 used for inter-class transition of the class C from the "large adult" class into the "CRS+infant" class. In order to require the reliability on inter-class transition or the stability of determination, the threshold time Tth7 is designated as a time such as 20 to 30 seconds comparatively longer than the threshold time Tth1 for the initial determination of the class C when an occupant gets in the vehicle.

The threshold time Tth8 corresponds to the timer Tm8 used for determining of the class C from one of the "CRS+infant" class, the "child" class, the "small adult," and the "large adult" class into the "vacant seat" class. In order to once determine the "vacant seat" class quickly when an occupant gets off the vehicle and then perform initial determination of the class C from the "vacant seat" class, the threshold time Tth8 is designated as a time such as two (2) seconds comparatively shorter than other threshold times for inter-class transition.

With reference to FIG. 3, a bidirectional inter-class transition is permitted in between (i) the "vacant seat" class belonging to the none-airbag-inflating class and (ii) the "CRS+infant" class also belonging to the none-airbag-inflating class. That is, a bidirectional inter-class transition is permitted between two none-airbag-inflating classes. In addition, a bidirectional inter-class transition is permitted practically between (i) the "vacant seat" class or the "CRS+infant" class and (ii) each of the "child" class belonging to the airbag-inflating class, the "small adult" belonging to the airbag-inflating class, and the "large adult" class belonging to the airbag-inflating class, via an intermediate class, if present. That is, a bidirectional inter-class transition is also permitted practically between the none-airbag-inflating class and the airbag-inflating class. By contrast, a bidirectional inter-class transition is not permitted between two airbag-inflating classes among the "child" class, the "small adult" class, and the "large adult" class, whereas only a unidirectional inter-class transition among the "child" class, the "small adult" class, and the "large adult" class is permitted from a subject class into a larger class that is a class larger than the subject class.

Such configuration is provided based on the following tendency. Change of the detected load W from a subject class into a smaller class, which is a class smaller than the subject class, often occurs in cases that the detected load is changed or decreased because of an improper posture of an occupant so as not to permit the load sensor to receive a proper load. In contrast, when the detected load is increased and such increased detected load continues for a predetermined time (duration), it is considered that the posture of the occupant returns to a normal proper posture. In such a case, an inter-class transition from the subject class into a lager class, that is a class larger than the subject class, is performed; this can suitably control an airbag inflation. It is noted that when the number of load sensors is reduced, for example, into two sensors that are disposed in both a front portion and a rear portion of either left or right side, the detected load may increase by an acceleration G applied to an occupant due to turning travel motion of the vehicle. To respond to such a case, a threshold time may be designated appropriately, thereby eliminating a useless inter-class transition into a larger class. An erroneous determination of determining a detected load as belonging to an improper larger class that is larger than a proper class may be rarely made when an occupant gets in a vehicle with a heavy baggage. In this case, the airbag 7 is inflated inevitably, providing the occupant with a minimal protection.

In contrast, an erroneous determination of determining a detected load as belonging to an improper smaller class that is smaller than a proper class may be made among the airbag-inflating classes that enable inflating of the airbag 7, such that the proper "large adult" class is erroneously determined as the improper "small adult" class or the "child" class. In this case, the air bag 7 is controlled to inflate in an intermediate or weak strength; when a collision of the vehicle occurs, the occupant may collide with a structure in front of the seat such as a dashboard or windshield, and not receive a suitable protection eventually. Therefore, the transition into a smaller class is prohibited in the present embodiment.

It is noted that when an erroneous determination is made which determines that the determined class C corresponds to a none-airbag-inflating class such as the "CRS+infant" class, the indicator of "OFF" lamp (see FIG. 4) is turned on which indicates disabling inflating of the airbag 7. This configuration enables the occupant to recognize that the determination of the airbag control is not correct and to be urged to take a proper normal seating posture. With reference to FIG. 5, when the erroneous determination is made which determines that the detected class C crosses over and falls below the threshold load Wth2 between the airbag-inflating class and the none-airbag-inflating class, the "OFF" lamp or a lamp indicating an airbag control state is indicated to enable the occupant to recognize such erroneous determination. This configuration dares to permit an inter-class transition from an airbag-inflating class into a none-airbag-inflating class even if such transition may be determined erroneously.

An aspect of the present embodiment described in the above is set out in the following clause. That is, the occupant determination apparatus is provided in a vehicle to control an airbag 7 to protect an occupant and include a load sensor 3 and a determination section 4. The load sensor 3 is to detect a load of the occupant who is seated in a seat of the vehicle to provide the detected load as a load signal W. The determination section 4 is to receive the load signal W and determine (i) presence or absence of the occupant and (ii) a physical size of the occupant, if present, by classifying the load signal W into a subject class among a plurality of classes, which are ordered from small to large according to the physical size, based on predetermined threshold loads Wth1 to Wth4, the subject class being stored as a determined class C. The determination section 4 is further to perform an inter-class transition of the determined class C from a transition source class being a present class into a transition destination class being a next class based on change of the received load signal. The plurality of classes include an airbag-inflating class that enables inflating of the airbag 7 at a collision of the vehicle and a none-airbag-inflating class that disables inflating of the airbag at a collision of the vehicle. The determination section is further configured to at least disable the inter-class transition, i.e., to make the determined class C remain in the transition source class being the present class when (i) both the transition source class and the transition destination class belong to the airbag-inflating class, and, simultaneously, (ii) the transition destination class is smaller than the transition source class and immediately adjacent to the transition source class while another class does not intervene in between the transition source class and the transition destination class.

The above configuration can provide an advantageous effect to reduce an erroneous determination of determining, as a smaller load class, a reduced detected load due to the change of the load based on the change of occupant's posture or based on acceleration due to travel motion of the vehicle, thereby achieving a suitable airbag control.

First Modification Example

The occupant determination unit 4 serving as the determination section may be configured to enable an inter-class transition of the determined class C from a transition source class to a transition destination class when (i) both the transition source class and the transition destination class belong to the airbag-inflating class that enables inflating of the airbag 7 at a collision of the vehicle, and, simultaneously, (ii) the transition destination class is smaller than the transition source class and unadjacent to the transition source class while another class intervenes in between the transition source class and the transition destination class. Being unadjacent to the transition source class signifies being not immediately adjacent to the transition source class.

The above configuration according to the first modification example may be provided when the change of the load is previously estimated to be less than a predetermined value. Under such stable condition where the change of the load is restricted, the above configuration can maintain the state of the present class suitably or enable a suitable inter-class transition, thereby providing a suitable airbag control. It is noted that the change of the load, e.g., due to the change of the posture of an occupant may be restricted beforehand by the following measures. That is, the seating position of an occupant may be restricted by a vehicle structure such as a seat or a console of the vehicle compartment; further, all the load applied to the seat may be detected by disposing at least four load sensors 3.

Second Modification Example

With reference to FIG. 4, the "vacant seat" class and the "CRS+infant" class each belong to the none-airbag-inflating class that disables inflating of the airbag 7 at a collision of the vehicle, whereas the "child" class, the "small adult" class, and the "large adult" class each belong to the airbag-inflating class that enables inflating of the airbag 7 at a collision of the vehicle. Further, a threshold load Wth2 is provided in between the "CRS+infant" class belonging to the none-airbag-inflating class and the "child" class belonging to the airbag-inflating class; the "child" class is larger than and immediately adjacent to the none-airbag-inflating class. With reference to the left-most column of FIG. 5, the threshold loads Wth1 to Wth4 are used for the initial determination (also referred to as an initial class determination) of the seated occupant class from the "vacant seat" class into any one of the "CRS+infant" class, the "child" class, the "small adult" class, or the "large adult" class, respectively, at the time when an occupant gets in the vehicle from outside of the vehicle.

In particular, the threshold load Wth2 is used for the initial class determination from the "vacant seat" class belonging to the none-airbag-inflating class into the "child" class belonging to the airbag-inflating class, at the time when the occupant gets in the vehicle.

Further, the threshold load Wth2 may be used also for an upward inter-class transition, which is performed after the initial class determination has been once completed, from the "CRS+infant" class belonging to the none-airbag-inflating class into the "child" class belonging to the airbag-inflating class; the "child" class belonging to the airbag-inflating class is larger than and immediately adjacent to the "CRS+infant" class belonging to the none-airbag-inflating class.

Further, the same threshold load Wth2 may be used for a downward inter-class transition, which is performed after the initial class determination has been once completed, from the "child" class belonging to the airbag-inflating class into the "CRS+infant" class belonging to the none-airbag-inflating class; again, the "CRS+infant" class belonging to the none-airbag-inflating class is smaller than and immediately adjacent to the "child" class belonging to the airbag-inflating class.

Yet further, as illustrated in (1) and (2) of FIG. 5, the same threshold load Wth2 may be used for a downward inter-class transition, which is performed after the initial class determination has been once completed, from the "large adult" class or the "small adult" class, which belongs to the airbag-inflating class, into the "CRS+infant" class belonging to the none-airbag-inflating class.

It is noted that, in contrast, the present second modification example provides an optional featured configuration as follows. An offset threshold load Wth2-ofs is used as a threshold load for a downward inter-class transition, which is performed after the initial class determination at the time of the occupant's getting in the vehicle has been once completed, from any one class of the "large adult" class, the "small adult" class, or "the "child" class, which belongs to the airbag-inflating class, into the "CRS+infant" class belonging to the none-airbag-inflating class.

One example of such downward inter-class transitions is illustrated in (3) of FIG. 5, which illustrates one downward inter-class transition from the "small adult" class belonging to the airbag-inflating class into the "CRS+infant" class belonging to the none-airbag-inflating class. The offset threshold load Wth2-ofs as illustrated in (3) of FIG. 5 is provided to be smaller than the threshold load Wth2 by a predetermined offset value. That is, the offset threshold load Wth2-ofs in (3) of FIG. 5 is obtained by offsetting the threshold load Wth2 towards the load-smaller side by the predetermined offset value.

The processes of inter-class transition using the offset threshold load Wth2-ofs are performed by replacing the threshold load Wth2 at S45 in the flowchart of FIG. 9 with the offset threshold load Wth2-ofs, and, the threshold load Wth2 at S52 in the flowchart of FIG. 10 with the offset threshold load Wth2-ofs. The inter-class transition using the offset threshold load Wth2-ofs can provide an advantageous effect when the transition source class belongs to the airbag-inflating class and the transition destination class belongs to the none-airbag-inflating class.

That is, according to the second modification example, the occupant determination unit 4 serving as the determination section may be provided as follows.

The determination section 4 performs, as the inter-class transition, an initial class determination based on the predetermined threshold loads Wth1 to Wth4. The initial class determination is defined as being performed at a time when an occupant gets in the vehicle (i.e., just after the occupant is seated in the seat of the vehicle following getting into the vehicle). The predetermined threshold loads Wth1 to Wth4 include a subject threshold load Wth2 defined between (i) a smallest airbag-inflating class (i.e., the "child" class) that is a transition source class belonging to an airbag-inflating class that enables inflating of an airbag 7 and (ii) a largest none-airbag-inflating class (i.e., the "CRS+infant" class) that is a transition destination class belonging to a none-airbag-inflating class that disables inflating of the airbag 7. The largest none-airbag-inflating class is defined as being smaller than and immediately adjacent to the smallest airbag-inflating class. Further, the determination section 4 performs, as the inter-class transition, a downward inter-class transition by using an offset threshold load Wth2-offs. The downward inter-class transition is defined as being performed after the initial class determination was completed. The downward inter-class transition is defined as transitioning from any transition source class (i.e., any one of the "large adult" class, the "small adult" class, or the "child" class) belonging to the airbag-inflating class into the largest none-airbag-inflating class (i.e., the "CRS+infant" class). The offset threshold load Wth2-ofs is defined as being smaller than the subject threshold load Wth2 by an offset value.

The change of the load due to the change of the posture of an occupant may be previously estimated to be greater than a predetermined value by the following. That is, the seating position of an occupant may be not restricted due to a vehicle structure such as a seat or a console in the vehicle compartment; further, decreasing the number of load sensors does not permit all the load applied to the seat to be detected properly. Under such unstable condition where the change of the load is previously estimated to be greater than a predetermined value, the configuration according to the second modification example using the offset threshold load can provide an advantageous effect to reduce the possibility of erroneous determination, thereby providing a suitable airbag control.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An occupant determination apparatus in a vehicle to control an airbag to protect an occupant, comprising:
    a load sensor to detect a load of the occupant who is seated in a seat of the vehicle and provide the detected load as a load signal; and
    a determination section to
        determine (i) presence or absence of the occupant and (ii) a physical size of the occupant by classifying the load signal into a subject class among a plurality of classes, which are ordered from small to large according to the physical size, based on predetermined threshold loads, the subject class being stored as a determined class, and
        perform an inter-class transition of the determined class from a transition source class being a present class into a transition destination class based on change of the received load signal,
    wherein:
    the plurality of classes include at least two airbag-inflating classes each enabling inflating of the airbag; and
    the determination section prohibits the inter-class transition of the determined class from the transition source into the transition destination class when
        (i) both the transition source class and the transition destination class belong to the at least two airbag-inflating classes, and, simultaneously,
        (ii) the transition destination class is smaller than the transition source class and immediately adjacent to the transition source class.

2. The occupant determination apparatus according to claim 1, wherein:
    the determination section is configured to enable the inter-class transition of the determined class from the transition source class into the transition destination class when (i) both the transition source class and the transition destination class belongs to the at least two airbag-inflating classes, and, simultaneously, (ii) the transition destination class is smaller than the transition source class and not immediately adjacent to the transition source class.

3. The occupant determination apparatus according to claim 1, wherein:
    the determination section performs, as the inter-class transition, an initial class determination based on the predetermined threshold loads at a time when the occupant gets in the vehicle,
    the predetermined threshold loads including a subject threshold load defined between (i) a smallest airbag-inflating class that is the transition source class belonging to the at least two airbag-inflating classes and (ii) a largest none-airbag-inflating class that is the transition destination class belonging to a none-airbag-inflating class that disables inflating of the airbag,
    the largest none-airbag-inflating class being smaller than and immediately adjacent to the smallest airbag-inflating class; and
    the determination section performs, as the inter-class transition, a downward inter-class transition by using an offset threshold load,
    the downward inter-class transition being performed after the initial class determination was completed,
    the downward inter-class transition being from any transition source class belonging to the at least two airbag-inflating classes into the largest none-airbag-inflating class,
    the offset threshold load being smaller than the subject threshold load by an offset value.

* * * * *